US011402900B2

(12) United States Patent
Liu et al.

(10) Patent No.: US 11,402,900 B2
(45) Date of Patent: Aug. 2, 2022

(54) AUGMENTED REALITY SYSTEM COMPRISING AN AIRCRAFT AND CONTROL METHOD THEREFOR

(71) Applicants: Beijing BOE Optoelectronics Technology Co., Ltd., Beijing (CN); BOE TECHNOLOGY GROUP CO., LTD., Beijing (CN)

(72) Inventors: Yali Liu, Beijing (CN); Chenru Wang, Beijing (CN); Ruijun Dong, Beijing (CN); Xuebing Zhang, Beijing (CN); Ke Li, Beijing (CN); Hao Zhang, Beijing (CN); Lili Chen, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 83 days.

(21) Appl. No.: 16/966,113

(22) PCT Filed: Jan. 3, 2020

(86) PCT No.: PCT/CN2020/070257
§ 371 (c)(1),
(2) Date: Jul. 30, 2020

(87) PCT Pub. No.: WO2020/143546
PCT Pub. Date: Jul. 16, 2020

(65) Prior Publication Data
US 2021/0041947 A1 Feb. 11, 2021

(30) Foreign Application Priority Data
Jan. 7, 2019 (CN) .......................... 201910013109.1

(51) Int. Cl.
*G09G 5/00* (2006.01)
*G06F 3/01* (2006.01)
(Continued)

(52) U.S. Cl.
CPC ............ *G06F 3/013* (2013.01); *G06T 19/006* (2013.01); *G06V 40/165* (2022.01); *G06V 40/193* (2022.01); *G06V 40/197* (2022.01)

(58) Field of Classification Search
CPC ...... G02B 27/01; G02B 27/0179; G02B 5/30; G06T 10/006; G06F 3/013; G06F 3/012; G06F 3/0487
See application file for complete search history.

(56) References Cited

U.S. PATENT DOCUMENTS

2013/0265331 A1 10/2013 Wu et al.
2016/0132725 A1 5/2016 Sakata et al.
(Continued)

FOREIGN PATENT DOCUMENTS

CN 103426282 A 12/2013
CN 204937488 U 1/2016
(Continued)

OTHER PUBLICATIONS

International Search Report and Written Opinion for International Application No. PCT/CN2020/070257 dated Mar. 26, 2020.
(Continued)

*Primary Examiner* — Weiming He
(74) *Attorney, Agent, or Firm* — Thomas | Horstemeyer LLP

(57) ABSTRACT

The present disclosure relates to the field of augmented reality technology, and provides a display device that includes a display configured to display an image and a movement controller configured to control a movement state of the display device according to displacement instruction (Continued)

information such that the display and a target object conform to a mutual position relationship.

13 Claims, 2 Drawing Sheets

(51) Int. Cl.
*G06T 19/00* (2011.01)
*G06V 40/16* (2022.01)
*G06V 40/18* (2022.01)

(56) References Cited

U.S. PATENT DOCUMENTS

| | | | |
|---|---|---|---|
| 2016/0291690 A1 | 10/2016 | Thorn et al. | |
| 2016/0313743 A1 | 10/2016 | Kim | |
| 2017/0240279 A1 | 8/2017 | Molnar et al. | |
| 2018/0059297 A1 | 3/2018 | Peroz et al. | |
| 2018/0253907 A1 | 9/2018 | Cashen et al. | |

FOREIGN PATENT DOCUMENTS

| | | | | |
|---|---|---|---|---|
| CN | 105677206 | * | 6/2016 | ........... G06F 3/0487 |
| CN | 106094857 A | | 11/2016 | |
| CN | 106444023 A | | 2/2017 | |
| CN | 205942090 U | | 2/2017 | |
| CN | 106571084 A | | 4/2017 | |
| CN | 107027014 A | | 8/2017 | |
| CN | 107027015 A | | 8/2017 | |
| CN | 107562179 A | | 1/2018 | |
| CN | 107657235 A | | 2/2018 | |
| CN | 208429245 | * | 5/2018 | |
| CN | 108139799 A | | 6/2018 | |
| CN | 108257145 A | | 7/2018 | |
| CN | 108475442 A | | 8/2018 | |
| CN | 109035873 A | | 12/2018 | |
| CN | 109117692 A | | 1/2019 | |
| CN | 109727317 A | | 5/2019 | |
| CN | 110244458 | * | 9/2019 | ............. G02B 27/01 |
| TW | 201341848 A | | 10/2013 | |
| WO | WO-0195016 A1 | * | 12/2001 | ........... G03H 1/0808 |
| WO | 2018171041 A1 | | 9/2018 | |
| WO | 2018196070 A1 | | 11/2018 | |
| WO | WO-2019066429 A1 | * | 4/2019 | ......... G02B 27/0081 |

OTHER PUBLICATIONS

First Office Action for CN Patent Application No. 201910013109.1 dated May 28, 2020.

* cited by examiner

AUGMENTED REALITY SYSTEM COMPRISING AN AIRCRAFT AND CONTROL METHOD THEREFOR

CROSS-REFERENCE TO RELATED APPLICATIONS

The present application is a national phase application under 35 U.S.C. § 371 of International Patent Application No. PCT/CN2020/070257, filed on Jan. 3, 2020, which is based on and claims priority to Chinese Patent Application No. 201910013109.1 filed on Jan. 7, 2019, the entire contents of which are incorporated herein by reference.

TECHNICAL FIELD

The present disclosure relates to the field of augmented reality technology and, in particular, to an augmented reality system and control method thereof.

BACKGROUND

Augmented reality technology is a new technology that combines real world information and virtual world information. Using, for example, computer science and technology, augmented reality technology simulates physical information, such as visual information, sound information, tactile information, and the like that is difficult to be experienced in a certain time and space range of the real world, and then superimposes simulated virtual information to the real world to be perceived by human senses, so as to achieve a sensory experience beyond reality. Therefore, real environment and virtual objects are superimposed on a same screen or space in real time or exists at the same time.

In the related art, an augmented reality product mainly includes functional modules such as an optical module, a sensor module, a camera module, a headphone module, and a structural wearable module. Users can wear these functional modules on their limbs and/or torso through the structural wearable module.

It should be noted that the information disclosed in the above background section is only for enhancing the understanding of the background of the present disclosure, and therefore may include information that does not constitute the prior art known to those skilled in the art.

SUMMARY

An object of the present disclosure is to provide an augmented reality system and control method thereof.

According to an aspect of the present disclosure, there is provided a display device, including: a display configured to display an image; and a movement controller configured to control a movement state of the display device according to received displacement instruction information so that the displayed image and the target object conform to a first mutual position relationship.

According to an aspect of the present disclosure, there is provided a display device control method for controlling the display device described above, including: displaying, by the display, an image; and controlling, by the movement controller, a movement state of the display device according to received displacement instruction information so that the displayed image and the target object conform to a first mutual position relationship.

According to an aspect of the present disclosure, there is provided an augmented reality system including an aircraft, an augmented reality module, a tracking module, and an adjustment module. The augmented reality module is fixed to the aircraft, and is configured to generate a virtual image; the tracking module is disposed on the aircraft, and is configured to detect position information of an eyeball of a user; the adjustment module is disposed on the aircraft, and is configured to adjust a flying attitude of the aircraft according to the position information of the eyeball of the user, so that the eyeball of the user can acquire the virtual image.

In an exemplary embodiment of the present disclosure, the tracking module includes a camera and a processing unit. The camera is configured to track and photograph face image information of the user; and the processing unit is configured to acquire the position information of the eyeball of the user according to the face image information.

In an exemplary embodiment of the present disclosure, the face image information includes iris image information of the eyeball, and the processing unit is further configured to determine an identity of the user based on the iris image information.

In an exemplary embodiment of the present disclosure, the augmented reality system further includes a distance sensor, which is configured to measure a distance between the user and the aircraft.

In an exemplary embodiment of the present disclosure, the adjustment module is further configured to adjust a flying attitude of the aircraft according to the distance between the user and the aircraft, so that the eyeball of the user is located in an exit pupil area of the augmented reality module.

In an exemplary embodiment of the present disclosure, the augmented reality module includes a display system and a display module. The display system is configured to generate image information; and the display module is configured to generate the virtual image according to the image information.

In an exemplary embodiment of the present disclosure, when the user acquires the virtual image, the display module is located on a side deviating from a frontal direction of the eyeball of the user, and the augmented reality module further includes a polarizing unit configured to transmit the virtual image to the eyeball of the user.

In an exemplary embodiment of the present disclosure, the polarizing unit is one or more of a diffraction grating, a free-form-surface prism, and an optical waveguide.

In an exemplary embodiment of the present disclosure, the augmented reality module further includes a display system configured to generate the image information.

In an exemplary embodiment of the present disclosure, the augmented reality system further includes a positioning module disposed on the aircraft and configured to obtain position information of the aircraft.

In an exemplary embodiment of the present disclosure, the augmented reality system further includes a power supply system including a solar panel disposed on the aircraft.

According to an aspect of the present disclosure, there is provided an augmented reality system control method for controlling the augmented reality system described above, including: generating, by the augmented reality module, an virtual image; tracking, by the tracking module, an eyeball position of a user; and adjusting, by the adjustment module, a flying attitude of the aircraft according to the eyeball position of the user so that the user can obtain the virtual image.

It should be understood that the above general description and the following detailed description are only exemplary and explanatory, and do not limit the present disclosure.

BRIEF DESCRIPTION OF THE DRAWINGS

The drawings herein are incorporated into the specification, constitute a part of the specification, illustrate embodiments consistent with the present disclosure, and together with the specification, server to explain the principle of the present disclosure. Understandably, the drawings in the following description are only some embodiments of the present disclosure, and to those skilled in the art, other drawings can also be obtained based on these drawings without paying any creative labor.

DETAILED DESCRIPTION

Figure 1:
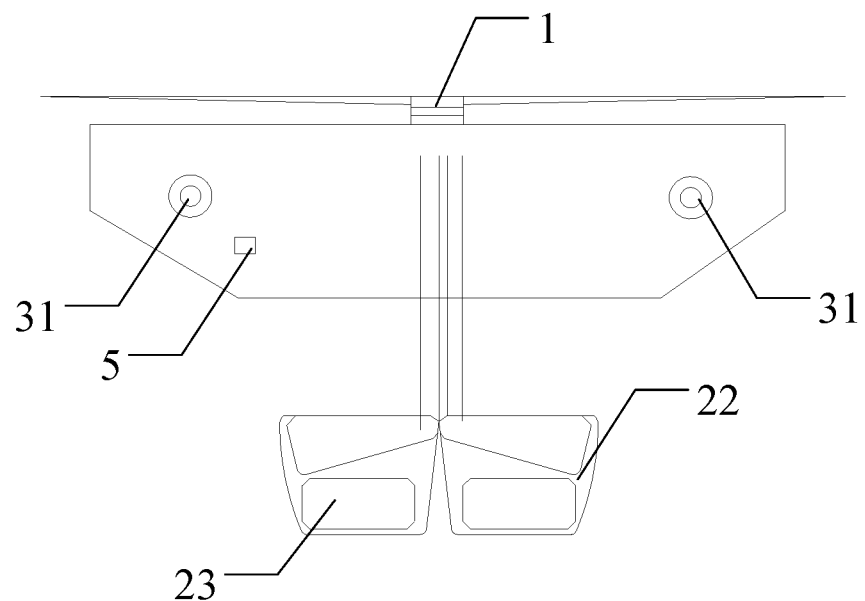
FIG. 1 is a front view of an augmented reality system according to an exemplary embodiment of the present disclosure.

Example embodiments will now be described more fully with reference to the drawings. However, the example embodiments can be implemented in various forms, and should not be construed as being limited to the examples set forth herein; on the contrary, these embodiments are provided so that the present disclosure is more comprehensive and complete, and fully convey the concept of the example embodiments to those skilled in the art. The same reference numerals in the drawings denote the same or similar parts, and thus their repeated description will be omitted.

Although in the specification, relative terms, such as "on" and "under," are used to describe the relative relationship between one component and another component shown, these terms used in the specification are only for convenience of description, for example, according to example directions shown in the drawings. It can be understood that if a device shown is turned upside down, then a component described as "on" will become the component as "under". Other relative terms, such as "high", "low", "top", "bottom", "left", "right," and the like, have similar meanings. When a structure is "on" another structure, it may mean that the structure is integrally formed on the other structure, or that the structure is disposed "directly" on the other structure, or that the structure is disposed "indirectly" on the other structure through another structure.

The terms "a", "an", and "the" are used to indicate the presence of one or more elements/components/etc. The terms "include" and "have" are used to indicate an open-ended inclusion and that there may be additional elements/component/etc. in addition to the listed elements/components/etc.

In the related art, an augmented reality product mainly includes functional modules, such as an optical module, a sensor module, a camera module, a headphone module, and a structural wearable module. Users can wear these functional modules on their limbs and/or torso through the structural wearable module.

However, these functional modules and the structural wearable module have certain weights and volumes, which brings great inconvenience to the user and reduces user experience.

The present disclosure provides a display device including: a display configured to display an image; a tracking module configured to acquire position information of a target object; and a movement controller configured to control a movement state of the display device according to received displacement instruction information so that the displayed image and the target object conform to a first mutual position relationship. The display device provided by the present disclosure further includes a displacement determining processor configured to generate the displacement instruction information according to the position information of the target object obtained by the tracking module. The displacement instruction information is embodied as information for adjusting a flying attitude of the aircraft in the following embodiments. The display device may be an augmented reality system, a virtual reality system, and other devices with a display function. The present disclosure only takes the augmented reality system as an example for description; however, the present disclosure is not limited thereto. Moreover, the target object includes but is not limited to an eyeball of a human user, an eyeball of an animal, or other image receiving objects or devices that may often move. The following embodiments are described by taking the target object as the eyeball of the user as an example. When the target object is the eyeball of the user, a distance relationship in the first mutual position relationship is in a range of 25 mm to 50 mm, and a deflection angle relationship in the first mutual position relationship is in a range of a left deflection of 60°, an upward deflection of 75°, and a downward deflection of 60° with reference to a center of the eyeball of the user. When the first mutual position relationship satisfies the above ranges, it can be ensured that the user can clearly view the displayed image. In the following description, using an augmented reality system as an example, the function of the display is implemented in an augmented reality module, and the function of the movement controller is implemented in an adjustment module.

Figure 2:
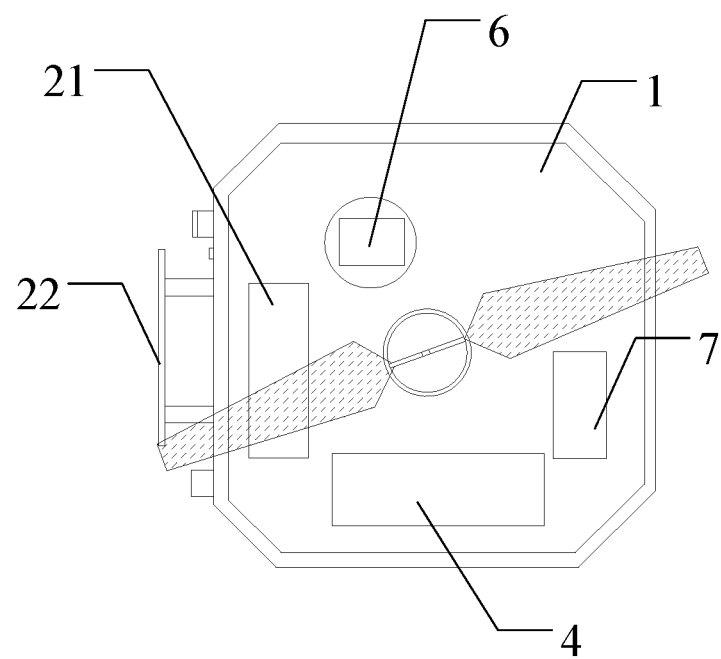
FIG. 2 is a top view of an augmented reality system according to an exemplary embodiment of the present disclosure.
Figure 3:
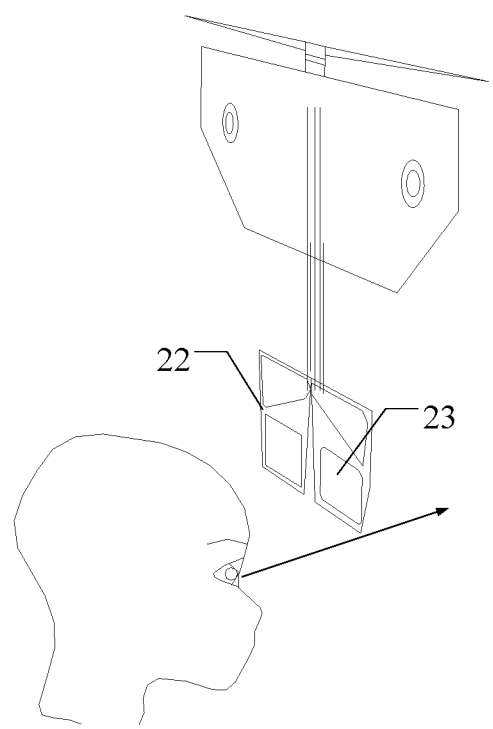
FIG. 3 is a view showing a positional relationship of an augmented reality system relative to a user according to an exemplary embodiment of the present disclosure.

An exemplary embodiment first provides an augmented reality system. FIG. 1 is a front view of an augmented reality system according to an exemplary embodiment of the present disclosure, FIG. 2 is a top view of an augmented reality system according to an exemplary embodiment of the present disclosure, and FIG. 3 is a view showing a position relationship of an augmented reality system relative to a user according to an exemplary embodiment of the present disclosure. The system includes an aircraft 1, an augmented reality module, a tracking module, and an adjustment module 4. The augmented reality module is fixed to the aircraft, and is configured to generate a virtual image. The tracking module is disposed on the aircraft, and is configured to detect position information of an eyeball of a user. The adjustment module 4 is disposed on the aircraft, and is configured to adjust a flying attitude of the aircraft according to the position information of the eyeball of the user, so that the eyeball of the user can acquire the virtual image. The adjustment of the flying attitude of the aircraft includes the adjustments of a height and a fuselage azimuth of the aircraft and the like. A relative position of the augmented reality module and the eyeball of the user can be adjusted by adjusting the flying attitude of the aircraft. Thus, the eyeball of the user can acquire the virtual image. The position information of the eyeball may include a frontal direction of the eyeball.

The present exemplary embodiment provides the augmented reality system including the aircraft, the augmented reality module, the tracking module, and the adjustment module. The augmented reality system can track the eyeball position of the user through tracking technology and, at the same time, use the adjustment module to adjust the attitude of the aircraft so that the virtual images can be continuously transmitted into the human eye in real time. The virtual images and the reality can be superimposed to present an augmented reality effect. At the same time, the system also carries the weight of the augmented reality module through the aircraft, which reduces a load on the user.

In an exemplary embodiment, the adjustment module 4 may include a geomagnetic sensor, a gyroscope, and a processor. The geomagnetic sensor is configured to measure space position information of the aircraft, and the gyroscope is configured to measure flight angle information of the aircraft. The processor can generate driving information according to the position information of the eyeball of the user when obtaining the space position information and the flight angle information of the aircraft. The driving information can directly drive a driving module of the aircraft to adjust a flying angle and flying height of the aircraft to enable the eyeball of the user to acquire the virtual image.

In an exemplary embodiment, the aircraft 1 shall drive the augmented reality module to stand still in the air or adjust the flight attitude. As shown in FIGS. 1, 2, and 3, the aircraft 1 may be a propeller aircraft. It should be understood that in other exemplary embodiments, the aircraft may also be other aircraft such as jet aircraft and the like.

In an exemplary embodiment, as shown in FIGS. 1, 2, and 3, the augmented reality module may include a display system 21 and a display module 22. The display system 21 is configured to generate image information, and the display module 22 is configured to generate the virtual image according to the image information. The display system 21 may include a main processor which may be configured to perform disparity processing to generate the image information that can be displayed in 3D, and the display module 22 can implement the virtual image displayed in 3D according to the image information. The display module 22 shall be located in a frontal direction of the eyeball of the user, so that the user can simultaneously view the virtual image when viewing a real image. In an exemplary embodiment, the display module 22 may be a display device such an OLED display, LCD, and the like. In order to prevent the display module 22 from blocking the real image, the display module 22 may use a transparent display panel.

In an exemplary embodiment, even if the display module 22 uses the transparent display panel, other structures of the display module 22 may also block the real image to some extent. In order to prevent the display module 22 from blocking the real image, as shown in FIG. 3, the display module 22 may be located on a side deviating from the frontal direction (an arrow direction in FIG. 3) of the eyeball of the user, for example, the display module may be located at a position above the frontal direction of the eyeball of the user. In this case, the augmented reality module may further include a polarizing unit 23, and the polarizing unit 23 may transfer the virtual image generated by the display module 22 that deviates from the frontal direction of the eyeball of the user to the eyeball of the user. In an exemplary embodiment, the polarizing unit may be an optical element such as a diffraction grating, a free-form-surface prism, and an optical waveguide. The diffraction grating may transmit the virtual image that deviates from the frontal direction of the eyeball to the eyeball based on the principle of light diffraction. The free-form-surface prism can transmit the virtual image that deviates from the frontal direction of the eyeball to the eyeball based on the principle of light reflection. It should be noted that when the polarizing unit is disposed on the augmented reality module, the algorithm for generating the driving information by the processor in the adjustment module needs to be adjusted accordingly so that the display module can be located at the position above the frontal direction of the eyeball of the user.

In an exemplary embodiment, as shown in FIG. 1, the tracking module may include a camera 31 and a processing unit (not shown). The camera 31 can be configured to track and photograph face image information of the user, and the processing unit can be configured to acquire the position information of the eyeball of the user according to the face image information. There may be two cameras 31, and the two cameras 31 may obtain the face image information of the user from different angles, respectively, so as to accurately position the user eyeball of the user. The processing unit may share the main processor in the display system 21. For example, the processing unit may be a central processing unit (CPU), microprocessor, image processor, or the like.

It should be understood that in the above exemplary embodiments, the augmented reality module is configured to generate the virtual image of augmented reality. In other exemplary embodiments, the augmented reality module may have other structures, for example, the augmented reality module may further include a gesture module. The gesture module may control the display module 22 with a gesture through a gesture sensor, for example, control display interface switching, virtual image selecting and the like of the display module 22 through the gesture. The gesture sensor may share the processor and camera in the tracking module. For another example, the augmented reality module may include a simultaneous localization and mapping module (SLAM). The simultaneous localization and mapping module can match the virtual image output by the augmented reality module and the real image, which all belong to the protection scope of the present disclosure.

In an exemplary embodiment, the camera 31 can capture the face image information of the user in real time, and the processing unit can analyze the position of the eyeball of the user in the face image information according to the face image information, thereby acquiring the position information of the eyeball of the user. For example, the processing unit may establish a two-dimensional coordinate system in the face image information, and the processing unit may store the face image information having the frontal direction of the eyeball of the user. In the face image information having the frontal direction, it is assumed that the coordinate of the left eyeball of the user is (0, 0), and the coordinate of the right eye is (5, 0). The camera 31 acquires the face image information of the user in real time. If the processing unit analyzes that the coordinate of the left eye of the user becomes (3, 0) and the coordinate of the right eye becomes (7, 0), it can indicate that the eyeball of the user is deflected to the right. At the same time, the processing unit can determine a right deflection angle of the eyeball of the user according to the size by which the coordinate is changed. If the processing unit analyzes that the coordinate of the left eye of the user becomes (3, 1) and the coordinate of the right eye becomes (7, 1), it can indicate that the eyeball is deflected to the upper right, and the processing unit can also determine an upward deflection angle and a right deflection angle of the eyeball of the user according to the size by which the coordinate is changed. The processing unit may obtain current position information of the eyeball according to the deflection direction and angle of the eyeball by using the position of the user's eyeball in the frontal direction as a reference point. It should be understood that in other exemplary embodiments, the camera may also obtain image information of other organs of the user, and the processing unit may also determine the position of the eyeball according to the image information of the other organs of the user and the relative positions of the other organs and the eyeball. For example, the camera can obtain entire head information of the user, and the processing unit can determine the position of the eyeball of the user according to the relative position relationships of the eyeball with the ear, nose and the like of the head in combination with the positions of the ear, nose, and the like, which all belong to the protection scope of the present disclosure.

The tracking module is configured to detect the position information of the eyeball of the user. It should be understood that, in other exemplary embodiments, the tracking module may also be implemented in other manners, which all belong to the protection scope of the present disclosure.

When the user use the above augmented reality system, there may be other people around, and the tracking module may mistake the other people as the user and thus obtain the position information of the eyeball of the other people, causing confusion in use. In an exemplary embodiment, the face image information may include iris image information of the eyeball, and the processing unit is further configured to determine an identity of the user based on the iris image information. The processing unit can store the iris image information of the eyeball of the user. The processing unit can compare the iris image information collected by the camera with the iris image information of the user during the process of detecting the position information of the eyeball by the tracking module. If the iris image information collected by the camera is the same as the iris image information of the user, the object tracked by the tracking module can be determined to be the user and the tracking can be continued. If the iris image information collected by the camera is different from the iris image information of the user, the object tracked by the tracking module can be determined to not be the user, and the tracking module may not track the object. At this time, the tracking module can track other objects to find the user, or the tracking module can continuously output the eyeball position of the user that is obtained last, so that the aircraft can stay where it was and wait for instructions.

In an exemplary embodiment, the user may control the display module through the gesture module. However, the gesture module may collect a gesture not from the user and cause misoperation. In an exemplary embodiment, the augmented reality module may further include a wireless transmission module and a mobile client. The wireless transmission module can transmit information with the mobile client, and the user can control the display module through the mobile client. The wireless transmission module may be a wireless transmission module such as a Bluetooth® wireless transmission module or a wireless fidelity (WIFI) wireless transmission module, and the mobile client may be a client such as a mobile phone computing device or a tablet computing device.

In an exemplary embodiment, as shown in FIG. 1, the augmented reality system may further include a distance sensor 5, which is configured to measure a distance between the user and the aircraft. The adjustment module may be further configured to adjust the flying attitude of the aircraft according to the distance between the user and the aircraft, so that the eyeball of the user is located in an exit pupil area of the augmented reality module. When the eyeball of the user is located in the exit pupil area of the augmented reality module, the user can clearly obtain the virtual image. The adjustment of the flying attitude of the aircraft includes the adjustment of the distance between the aircraft and the eyeball of the user.

In an exemplary embodiment, as shown in FIG. 2, the augmented reality system may further include a positioning module 6. The positioning module 6 may be disposed on the aircraft 1 to obtain position information of the aircraft. The position information of the aircraft can be shared by the aircrafts in the respective augmented reality systems, and the adjustment module can also adjust the flying attitude of the aircraft according to the position information of the other aircraft to avoid collision with the other aircraft. For example, the positioning module 6 may be a global positioning system (GPS) module.

In an exemplary embodiment, as shown in FIG. 2, the augmented reality system may further include a power supply system 7, and the power supply system may include a solar panel arranged on the aircraft. In other exemplary embodiments, the power supply system may further include a storage battery, and the storage battery may store electrical energy generated by the solar panel so that the augmented reality system can be used in a weak-light environment.

Figure 4:
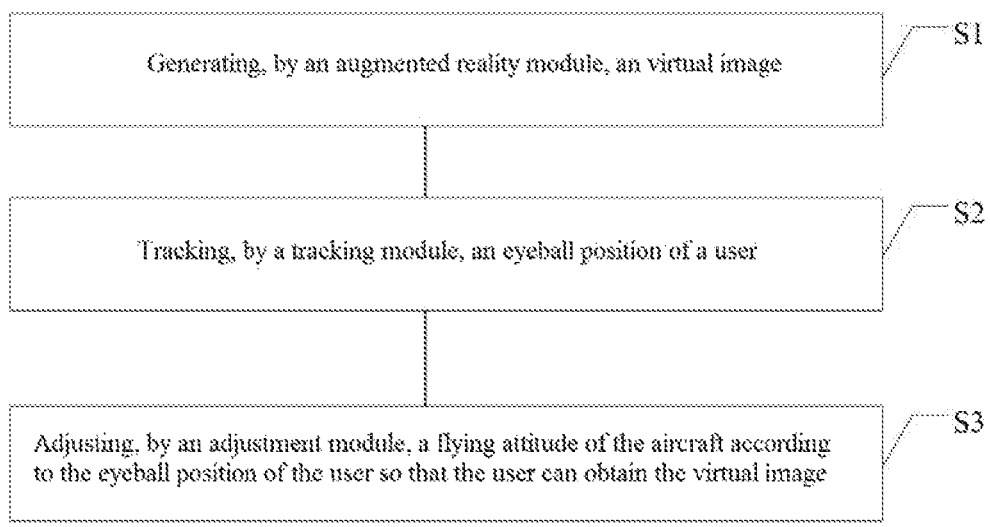
FIG. 4 is a flowchart of an augmented reality system control method according to an exemplary embodiment of the present disclosure.

An exemplary embodiment of the present disclosure provides an augmented reality system control method for controlling the augmented reality system described above. FIG. 4 is a flowchart of an augmented reality system control method according to an exemplary embodiment of the present disclosure. As shown in FIG. 4, the method includes: step S1, generating, by the augmented reality module, an virtual image; step S2, tracking, by the tracking module, an eyeball position of a user; and step S3, adjusting, by the adjustment module, a flying attitude of the aircraft according to the eyeball position of the user so that the user can obtain the virtual image.

The control method for the augmented reality system provided by the present exemplary embodiment has the same technical features and working principles as the above-mentioned augmented reality system, which has been described in detail above and will not be repeated herein.

Those skilled in the art will easily conceive of other embodiments of the present disclosure after considering the description and practicing the invention disclosed herein. The present application is intended to cover any variations, uses, or adaptive changes of the present disclosure that follow the general principle of the present disclosure and include the common knowledge or customary technical means in the art which is not disclosed in the present disclosure. The description and example are to be considered exemplary only, and the true scope and spirit of the present disclosure are pointed out by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A display device, comprising:
a display configured to display an image;
a movement controller; and
an aircraft configured to drive the display device to move under control of the movement controller,
wherein the movement controller is configured to adjust a flying attitude of the aircraft to control a movement state of the display according to displacement instruction information so that the display and an eyeball of a user conform to a mutual position relationship.

2. The display device according to claim 1, wherein the display is an augmented reality display.

3. The display device according to claim 2, wherein the augmented reality display further comprises a polarizing device configured to project a displayed image to the eyeball of the user.

4. The display device according to claim 3, wherein the polarizing device is at least one of: a diffraction grating, a free-form-surface prism, and an optical waveguide.

5. The display device according to claim 2, wherein the mutual position relationship is that the eyeball of the user is located in an exit pupil area of the augmented reality display.

6. The display device according to claim 5, wherein the mutual position relationship comprises a distance relationship between the display and the eyeball of the user.

7. The display device according to claim 6, wherein the distance relationship is that a distance between the display and the eyeball of the user in a range of 25 mm to 50 mm.

8. The display device according to claim 1, wherein the display device further comprises a positioning device configured to acquire position information of the display device.

9. The display device according to claim 1, wherein the display device further comprises a power supply system comprising at least one solar panel arranged on the display device.

10. The display device according to claim 1, wherein the display device further comprises:

a tracking device configured to obtain position information of the eyeball of the user; and a displacement determining processor configured to generate the displacement instruction information according to the position information of the eyeball of the user obtained by the tracking device.

11. The display device according to claim 10, wherein the tracking device comprises:

a camera configured to track and photograph face image information of the user; and an information processor configured to acquire the position information of the eyeball of the user according to the face image information.

12. The display device according to claim 11, wherein the face image information comprises iris image information of the eyeball, and the information processor is further configured to determine an identity of the user based on the iris image information.

13. A control method for controlling a display device comprising a display, a movement controller, and an aircraft configured to drive the display device to move under control of the movement controller, comprising:

displaying, by the display, an image; and adjusting, by the movement controller, a flying attitude of the aircraft to control a movement state of the display according to displacement instruction information so that the display and an eyeball of a user conform to a mutual position relationship.

* * * * *